US010399689B2

(12) United States Patent
Darnell et al.

(10) Patent No.: US 10,399,689 B2
(45) Date of Patent: Sep. 3, 2019

(54) OPTIMIZING AIRCRAFT CONTROL BASED ON NOISE ABATEMENT VOLUMES

(71) Applicant: GE Aviation Systems LLC, Grand Rapids, MI (US)

(72) Inventors: Mark Darnell, Ada, MI (US); David Lax, Grand Rapids, MI (US); Brandon James Rhone, Kentwood, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/616,910

(22) Filed: Jun. 7, 2017

(65) Prior Publication Data
US 2018/0354636 A1  Dec. 13, 2018

(51) Int. Cl.
*B64D 31/06* (2006.01)
*B64C 19/00* (2006.01)
*G01C 21/20* (2006.01)
*F02K 1/34* (2006.01)
*G05D 1/06* (2006.01)
*G08G 5/00* (2006.01)

(52) U.S. Cl.
CPC ............... *B64D 31/06* (2013.01); *B64C 19/00* (2013.01); *B64D 33/06* (2013.01); *G01C 21/20* (2013.01); *G05D 1/0661* (2013.01); *G08G 5/0034* (2013.01); *B64C 2220/00* (2013.01)

(58) Field of Classification Search
CPC ........ B64D 31/06; B64D 33/06; G01C 21/20; B64C 19/00; B64C 2220/00; G05D 1/0661; G08G 5/0034
See application file for complete search history.

(56) References Cited

U.S. PATENT DOCUMENTS

| 3,715,752 | A | * | 2/1973 | Garrett | G01S 13/913 342/33 |
|---|---|---|---|---|---|
| 3,911,436 | A | * | 10/1975 | Schanzer | G01S 1/02 244/184 |
| 4,662,171 | A | * | 5/1987 | Jackson | F02C 9/00 60/233 |
| 5,299,765 | A | | 4/1994 | Blechen | |
| 7,584,028 | B2 | | 9/2009 | Burnside | |
| 7,836,700 | B2 | * | 11/2010 | Viswanathan | F02K 1/44 239/265.11 |
| 2008/0114503 | A1 | | 5/2008 | Burnside | |

(Continued)

FOREIGN PATENT DOCUMENTS

EP    2 584 422 A1    4/2013
FR    3040801 A1    3/2017

OTHER PUBLICATIONS

Extended European Search Report and Opinion issued in connection with corresponding EP Application No. 18176117.2 dated Oct. 30, 2018.

*Primary Examiner* — Behrang Badii
*Assistant Examiner* — Daniel L Greene
(74) *Attorney, Agent, or Firm* — Amin, Turocy & Watson, LLP

(57) ABSTRACT

An aircraft control system and method to optimize aircraft control based on noise abatement volumes. A noise abatement component computes optimal flight and engine control based on a line-of-sight distance to minimize direct operating cost (DOC) while complying with community noise regulations.

20 Claims, 9 Drawing Sheets

(56) References Cited

U.S. PATENT DOCUMENTS

2008/0312781 A1* 12/2008 Nikolic .................... G01D 7/04
    701/14
2010/0309310 A1* 12/2010 Albright .............. G08G 5/0082
    348/135
2013/0092791 A1* 4/2013 Bakker ................ G05D 1/0653
    244/1 N
2013/0327014 A1* 12/2013 Moulebhar ............. F02K 3/065
    60/226.2

\* cited by examiner

OPTIMIZING AIRCRAFT CONTROL BASED ON NOISE ABATEMENT VOLUMES

TECHNICAL FIELD

The subject disclosure relates to systems and methods for aircraft noise abatement.

BACKGROUND

The subject disclosure relates to optimizing aircraft control in order to minimize Direct Operating Cost (DOC) while complying with noise constraints and or optimizing control to concurrently minimize DOC and noise. As cost of fuel increases, airlines are interested in consuming less fuel. Current flight operations are often suboptimal and use more fuel than necessary.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products are described.

By optimizing aircraft control to minimize fuel burn and complying with noise restrictions or to minimize noise while keeping DOC low, airlines can decrease total cost of operations.

In an embodiment, an aircraft control system comprises: a processor that executes the following computer executable components stored in a memory: a set of sensors, gauges, and positioning systems that measure and estimate an aircraft state; a mapping component that maps noise-restricted areas of a flight path defined by relative position of the aircraft to ground noise restriction locations; and a noise abatement component that computes optimal flight and engine control based on a line-of-sight distance to ground noise restriction locations or geographical point of interest to minimize direct operating cost (DOC) while obeying noise constraints.

In another embodiment, the aircraft control system further comprises a modeling component that models how sound from an engine of the aircraft varies with thrust and distance of the aircraft from ground, wherein the noise abatement component can generate data to employ for increasing thrust of the engine, and thus sound produced by the engine, while complying with maximum sound pressure level permitted on the ground.

In another embodiment, the aircraft control system further comprises an artificial intelligence component that performs a utility-based analysis in connection with optimizing the DOC and respective noise abatement.

In another embodiment, a computer program product for facilitating aircraft noise abatement, the computer program product comprising a computer readable storage medium having program instructions embodied therewith, the program instructions executable by a processor to cause the processor to: use a set of sensors, gauges, and positioning component to measure and estimate state of an aircraft; use a mapping component to map noise-restricted areas of a flight path defined by relative position of the aircraft to ground noise restriction locations; and use a noise abatement component to compute optimal flight and engine control based on a line-of-sight distance to ground noise restriction locations or geographical point of interest to minimize DOC while obeying noise constraints.

In some embodiments, elements described in connection with the computer-implemented method(s) can be embodied in different forms such as a system, a computer program product, or another form.

DETAILED DESCRIPTION

Figure 1:
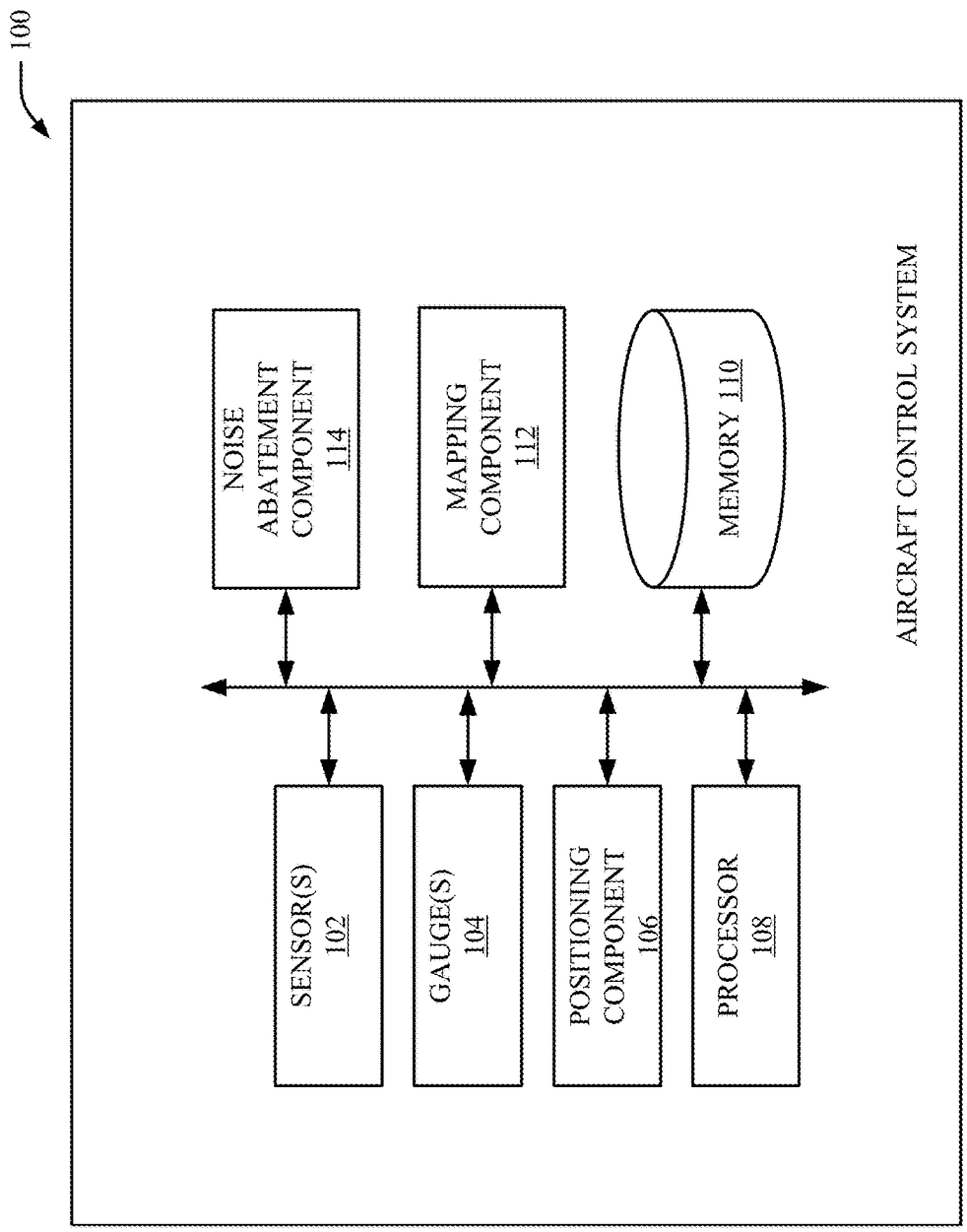
FIG. 1 illustrates a system for aircraft noise abatement in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

By improving the optimality of control throughout a flight, airlines can decrease their operating cost. One suboptimal portion of a flight is transit through noise-restricted areas (also called noise-restricted volume, noise abatement volume, noise-restricted airspace volume, noise-restricted airspace, etc.). When complying with noise constraints in noise-restricted areas encountered during a climb shortly after takeoff, thrust is decreased at a specified altitude then increased at a higher altitude. The operator is required to comply with a specified maximum sound pressure level on the ground referred to as community noise. Traditionally, to assure compliance, the altitudes are conservatively specified independent of the airplane position relative to the ground. Consequently, the results is not a minimal direct operating cost (DOC). Direct operating cost is associated with fuel cost and time cost. When noise is an added parameter, DOC is often equal or greater than prior to consideration of noise. Minimizing DOC and complying with noise restrictions are often conflicting objectives. In complying with noise restrictions, thrust is decreased, which can delay reaching a higher altitude where greater efficiencies can be realized. A noise cost can be a controlling factor while minimizing DOC or DOC can be a controlling factor while complying with noise constraints. By optimizing aircraft control to minimize fuel burn while complying with noise restrictions or concurrently minimizing cost and noise, airlines can decrease their total cost of operations.

The present innovation(s) can be used as a flight planning or air traffic management tool that allocates noise level to each aircraft. In addition to being in the aircraft, this technology can be located on the ground or any suitable location. The present innovation(s) measure and estimate an aircraft state so that fuel is saved by applying suboptimal thrust and configuration changes only where needed. The aircraft state can include but is not limited to aircraft position, altitude, speed, engine control, fuel, thrust, etc. Fuel savings can be achieved by finding an optimal airspeed and thrust that minimizes cost while admissible thrust control is constrained to comply with noise restriction. The developed technology led to a new definition of noise restriction. That is, the maximum permissible sound as a function of slant range (e.g., straight line distance or line-of-sight distance) to specific geographic locations. This definition can be used to determine an optimal flight (e.g., can include, but is not limited to, flight path, flight resource consumption, flight resource allocation, etc.) that complies with community noise restriction. For a commercial air transport, an optimum flight can be defined as a state trajectory that results from flying an airplane according to an optimal control history that minimizes DOC.

The optimum flight can be built in to the operating cost minimization routine to allow an operator to select what to control. Knowing a maximum engine control that will comply with noise regulations, the operator is free to control what to minimize. Sound can be modeled based on various parameters and engine control such as thrust, engine pressure ratio, flight path angle, angle of attack, etc. So, where thrust or another specific engine control is mentioned as a basis for the sound produced by the engines, other parameters and engine controls may be used.

FIG. 1 illustrates an aircraft control system 100 in accordance with an embodiment. The system 100 includes a processor 108 and memory 110 for executing and storing computer executable components and/or code in accordance with various implementations disclosed herein. The sensor(s) 102, gauge(s) 104, and positioning component 106 within the system 100 continuously measure and estimate an aircraft state such as aircraft position, altitude, speed, engine control, fuel, thrust, etc. A mapping component 112 of system 100 can be any suitable type of positioning system that calculates dimensional position(s). Although, it is desirable to have a positioning system that tracks movement of the aircraft in at least a 3-dimensional position including latitude, longitude and altitude.

The noise abatement component 114 takes the aircraft state information and computes optimal flight and engine control while factoring in noise-restricted locations. Noise-restricted areas are mapped by the mapping component 112. These locations and corresponding noise levels may be downloaded from a database containing pre-defined noise restriction locations. Noise-restriction location or ground noise restriction location is a general term that includes any applicable area or space. It can also be areas not in the database where the operator desires to abate noise level. Given that the aircraft control system 100 can continually measure and estimate current aircraft state, noise abatement can be computed on-board and generate a different optimal flight if rerouting is desired. Alternatively, the aircraft can share its data to a ground control system, which in turn can send a new optimal flight to the aircraft. This is especially helpful when the planned route need to be changed.

For flight planning, the noise abatement component 114 can also generate predefined noise routes based on class and size of the aircraft and predicted aircraft state. A flight plan is a predefined noise routes for optimal noise, fuel, and time for most aircraft or specific to each aircraft class and size. The rate that aircraft fuel burns typically depends on the aircraft weight, atmospheric conditions, aircraft speed, altitude, etc. An international plane carrying over 500 people can burn 36,000 gallons (150,000 Litters) of fuel over the course of a 10-hour flight and approximately 5 gallons of fuel per mile (12 liters per kilometer). Depending on the route and the time it takes to reach a destination, there can be a significant difference in fuel weight and the amount of fuel required. By simply saving a few pounds of fuel per flight, commercial airline companies can save a large amount of money per year over their whole fleet of aircraft. This can lead to increased profits and decreased ticket prices. Smaller ticket prices can provide one airline an advantage over another airline. Thus, flight planning is a significant component in connection with optimizing aircraft fuel economy.

Figure 2:
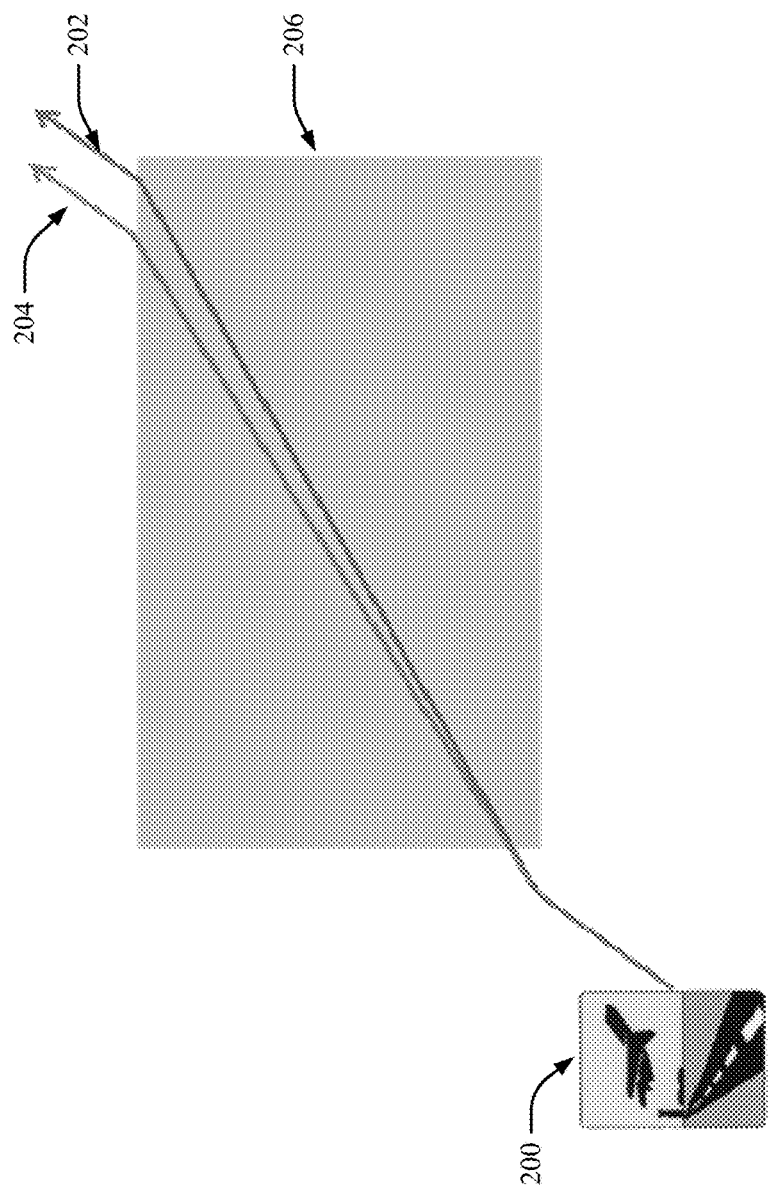
FIG. 2 illustrates an effect of optimizing flight through a noise abatement volume in accordance with one or more embodiments described herein.

As an example, compare flight profiles 202 and 204 in FIG. 2. Flight profile 202 illustrates the way a flight might be flown with existing technology. That is the optimal speed is determined by unconstrained thrust. Flight profile 204 illustrates how a flight might be flown with the optimal speed determined by thrust that is constrained to comply with the noise regulation. Shortly after takeoff, both flight profiles 202 and 204 go through the noise-restricted area 206. The flight path outside the noise-restricted area is the optimal trajectory that results from the unconstrained optimal control. This is the result of the thrust control not being limited to comply with the noise regulation.

Notice how the flight profile 202 departs from the optimal flight profile 204 when entering the noise-restricted area due to the use of decreased thrust without changing speed. The cost of the optimal flight profile 204 is less than the suboptimal flight profile 202 for two reasons. First, the flight profile 204 through the noise-restricted area 206 is optimal. Secondly, due to the difference in speed, the aircraft exits the noise-restricted area 206, where thrust is unconstrained and fuel economy is better, at an earlier time. In optimal control theory, an admissible control is defined as the control history that accurately complies with operational and performance constraints. Thus, a novel aspect of the innovations described herein is admissible control that is accurately constrained to comply with noise regulations and yield optimized performance. The optimal flight profile 204 represents a constructive tradeoff between flying optimally within the noise-restricted area 206 and a point at which the aircraft exits the noise-restricted area 206. Additionally, speed may vary as the aircraft ascends, and thus the aircraft is flying the optimal speed at most every point in the noise-restricted area 206.

An implementation of this invention includes a de-rate setting to facilitate regulating thrust to limit amount of noise produced by engines of the aircraft. During takeoff before entering into the noise-restricted area 206, the engine control has a greater thrust and a maximum climb angle to reach furthest off the ground. Whereas, while the aircraft is within a noise-restricted area 206, a reduced thrust and a corresponding decreased climb angle is employed, which produces less noise. The different components of the aircraft control system 100 exchange information to determine optimal flight and engine control(s). Furthermore, as thrust is being decreased, the noise abatement component 114 of system 100 continually calculates optimal speed at most every throttle setting. A similar computation process is applies for landing as it does with takeoff except the aircraft is lighter with decreased fuel weight and the aircraft is descending rather than climbing. An additional element that the noise abatement component 114 factors in and takes advantage of is the increasing distance between the aircraft and the ground where noise is regulated.

Figure 3:
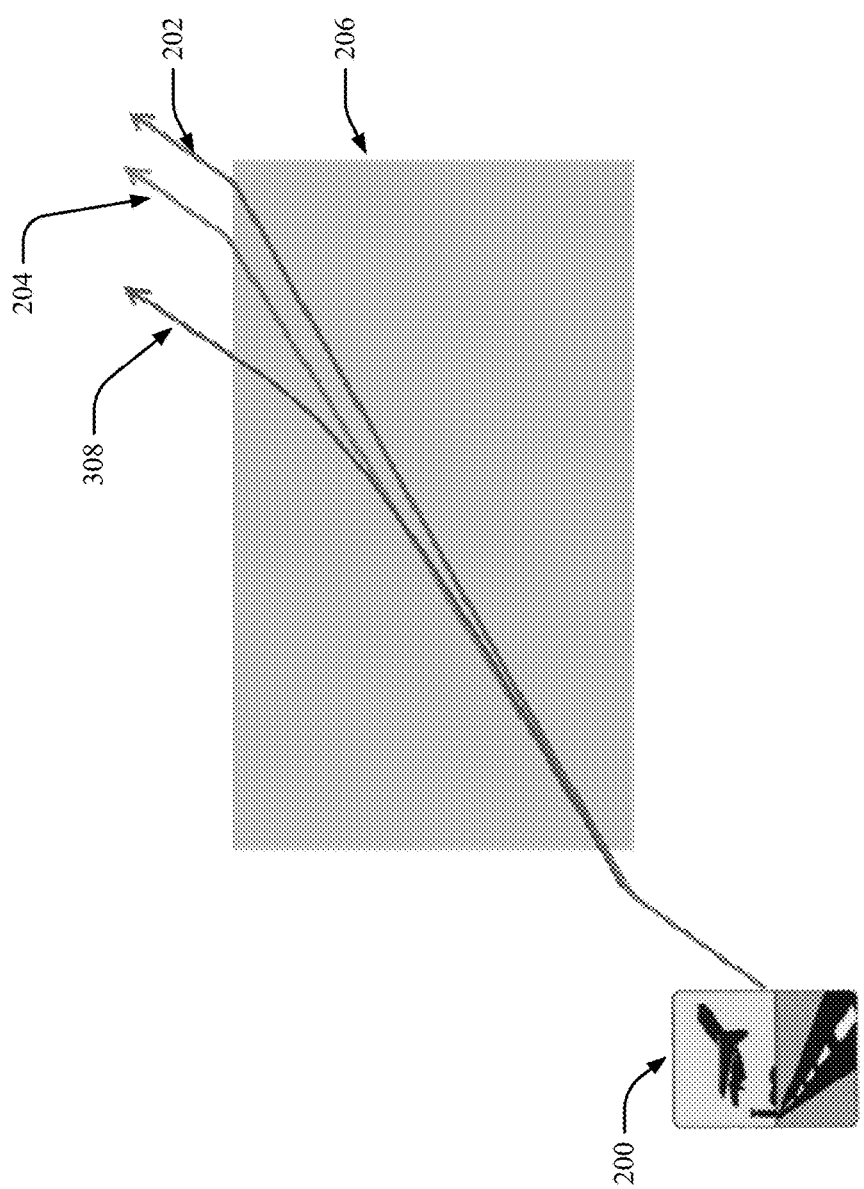
FIG. 3 illustrates an effect of optimizing flight with increasing thrust in accordance with one or more embodiments described herein.

See for example flight profile 308 from FIG. 3, which depicts the added advantage in distance that flight profiles 202 and 204 from FIG. 2 do not. Flight profile 308 increases thrust with altitude. Consider an object that produces sound; as the distance between a point in space and the object increase, the magnitude (or volume) of the sound decreases. More specifically, the measured noise called the sound pressure level is inversely proportional to the distance from the source of the sound. This concept can be applied to the sound produced by an aircraft engine. Given a model of how the sound from an engine varies with thrust and the distance of the aircraft from the ground, the thrust of the engine (and thus the sound produced by the engine) may be increased while complying with the maximum sound pressure level permitted on the ground. Applying this to the flight path, thrust can increase as altitude increases while still complying with the noise restrictions.

As the aircraft moves further away from the ground, the thrust upper limit relaxes allowing the aircraft to fly more optimally. Thus, the control approaches the unconstrained optimum as the airplane ascends and the distance from the community increases. This results in the admissible control through the noise-restricted volume approaching the unconstrained optimum as altitude increases until the aircraft exits the volume. Additionally, the admissible control may return to the unconstrained control at an altitude below the upper altitude of the noise-restricted airspace if the most optimal thrust complies with community noise regulations. It is to be appreciated that flight plan constraints intended for safety are significant factors for consideration (e.g., a flight plan safety constraints require being at a particular altitude at a given waypoint). In some cases, there may be contradictory constraints where there is no ideal solution (e.g., noise below some level, but climb very fast), in that case the pilot can be alerted of being projected to be above a noise limit. The pilot can decide whether to takeoff, or wait for a noise restriction to clear (e.g., perhaps early in the morning)

Figure 4:
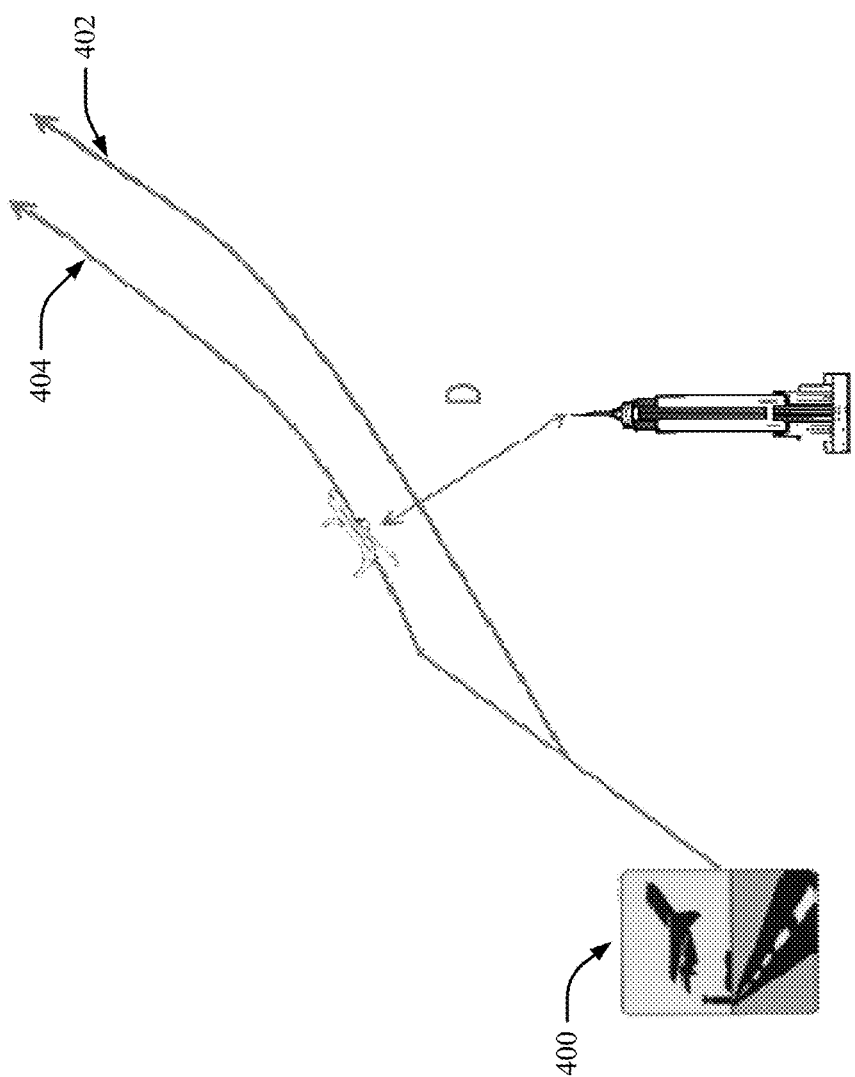
FIG. 4 illustrates a representation of noise based on specific point on the ground in accordance with one or more embodiments described herein.

Previous to the present innovation(s), the boundary of a noise restriction is defined by an airspace volume. However, in practice the description may instead be defined by the line-of-sight distance between the aircraft and geographic points on the ground. This approach eliminates the need for a noise-restrictive volume or altitude band, as depicted in FIG. 4. Flight profile 402 represents the flight path that results from defining the noise limit relative to the ground and flight profile 404 represents the path that results as a function of the slant range to the building.

By using distance to specific geographic locations where community noise is an issue, the aircraft can fly more optimally as it ascends away from that specific point. When approaching locations where noise restriction is necessary, the aircraft can then decrease thrust based on the distance to that point in order to comply with the noise regulations. If the location of specific areas is not available, the geographical location used to regulate noise can be the point on the ground closest to the aircraft. Using the distance to specific geographical locations and using the distance to the ground are different embodiments of this technology. The best formulation is determined using the aircraft control system 100 with the mapping component 112 containing noise-restrictive areas on the ground and the noise abatement component 114 computes optimal flight and engine control. At any moment, the positioning component 106 can obtain location data of the aircraft and the noise abatement component 114 can calculate optimal flight and engine control(s) that comply with community noise regulations.

Additionally, the aircraft control system 100 can also factor in environmental noise. Such city noise can include other aircraft noise, so that all the noise produced is not over community regulated noise limit. The ground piece of the aircraft control system 100 can factor in the number of aircraft within an area and allocate the noise level limit to each aircraft. The allocation level is going to be smaller when there are a lot of aircraft traffic than when there are fewer aircraft landing and taking off.

Figure 5:
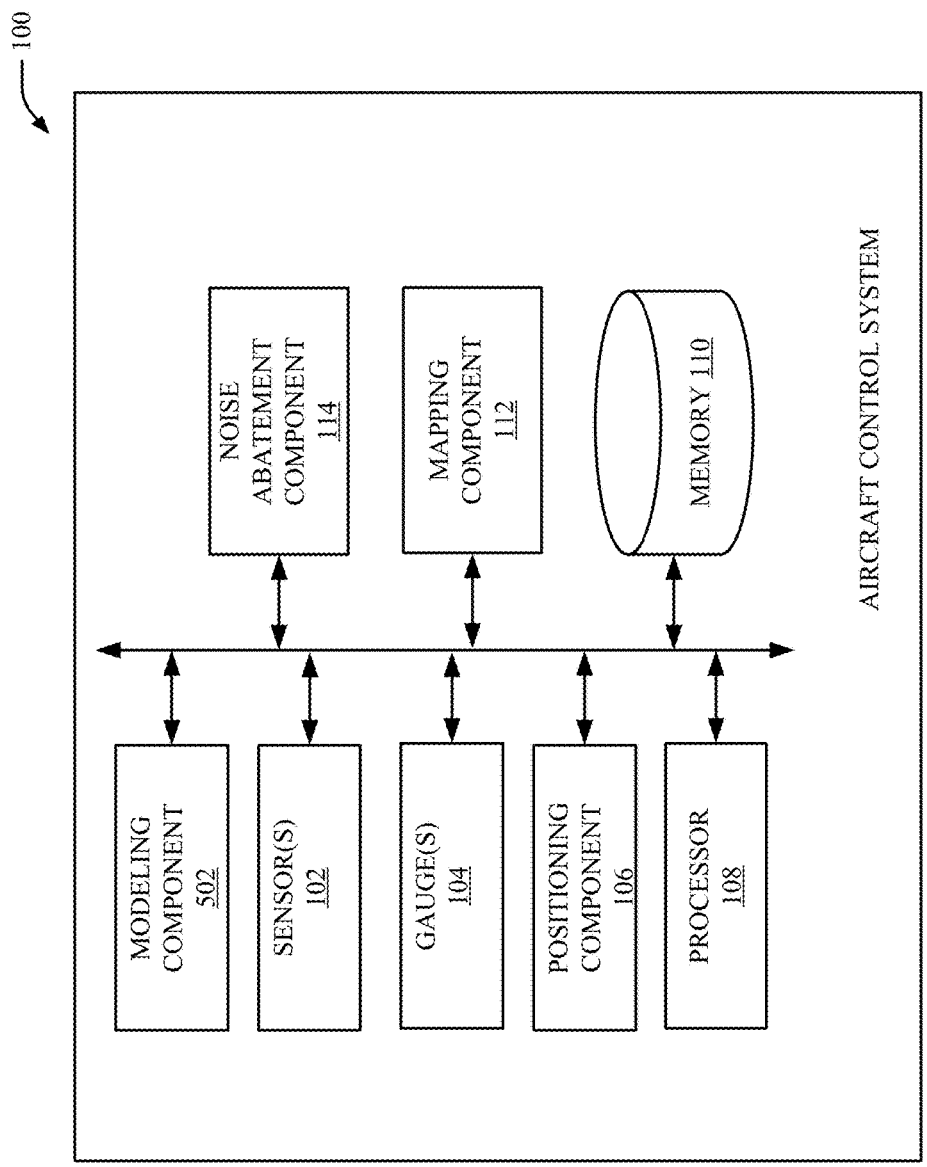
FIG. 5 illustrates a system for aircraft noise abatement including a modeling component in accordance with one or more embodiments described herein.

FIG. 5 illustrates a modeling component 502 of the aircraft control system 100 in accordance with an embodiment. The modeling component 502 models how sound from an engine of the aircraft varies with thrust and distance of the aircraft from ground. As the aircraft moves further away from the ground, the magnitude of the sound decreases. The modeling component 502 can model how sound varies with different engine control and ground distance. The noise abatement component 114 analyzes the sound produced and compute optimal flight and engine control. This process can be analyzed and computed continually during flight or as part of the flight planning. The noise profile is not limited to thrust. The noise profile can be based on a number of aircraft characteristics such as noise versus flight path angle or noise versus angle of attack, etc. This is possible since angle of attack and flight path angle will vary with the amount of thrust generated by the engines. The noise abatement component 502 can generate data to employ for changing noise profile while complying with maximum sound pressure level permitted on the ground.

Figure 6:
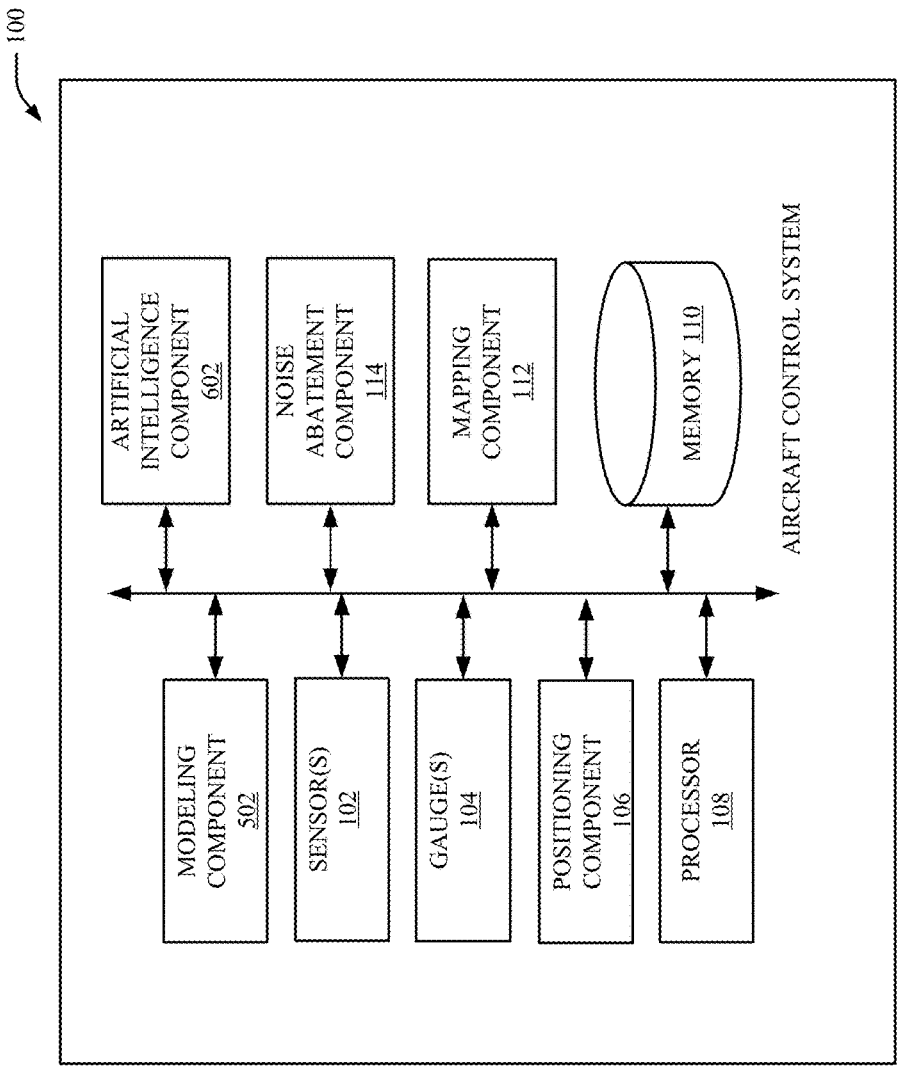
FIG. 6 illustrates a system for aircraft noise abatement including an artificial intelligence component in accordance with one or more embodiments described herein.

FIG. 6 illustrates an artificial intelligence component 602 of the aircraft control system 100 in accordance with an embodiment. The artificial intelligence component 602 can perform a utility-based analysis in connection with optimizing the DOC and respective noise abatement. The artificial intelligence component 602 can recognize the course of flight, deduce whether changes need to be made, and analyze the data to achieve the goal of optimizing aircraft control in order to minimize DOC. It is appreciated that there are other alternative technologies such as gradient-descent search, simplex search, brute force exhaustive search, Bayesian modeling, evolutionary computation, neural networks, etc.

The embodiments of the present invention herein can employ artificial intelligence (AI) to facilitate automating one or more features of the present invention. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present invention, components of the present invention can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 7:
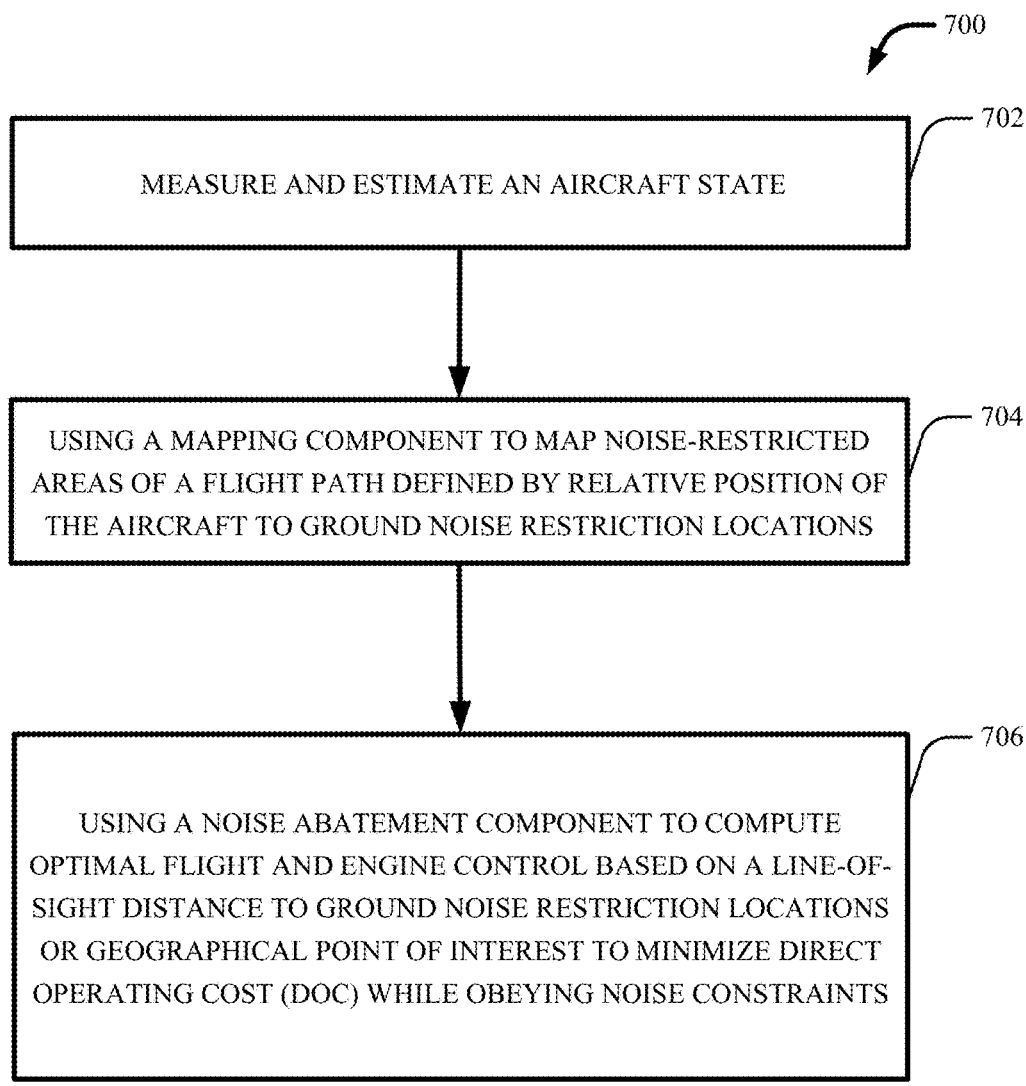
FIG. 7 illustrates an example, non-limiting method in accordance with one or more embodiments described herein.

FIG. 7 illustrates a flow diagram 700 in accordance with an implementation where optimal flight and engine control is calculated that minimizes DOC while obeying noise constraints. At 702, a determination as to the aircraft state is made which is a measure and estimate of the aircraft position, altitude, speed, engine control, fuel, thrust, etc. At 704, the noise-restricted areas of a flight path defined by relative position of the aircraft to ground noise restriction locations is mapped. Then at 706, optimal flight and engine control is computed based on a line-of-sight distance to ground noise restriction locations or geographical point of interest to minimize DOC while obeying noise constraints. A map of these noise-restricted areas can be downloaded from a database. The noise-restricted areas can also be inputted by the operator for locations the operator wants to restrict the noise level. This is particularly helpful for aircrafts that flies over populated city where the community wants a reduced the noise level.

During the course of a flight, the sensor(s) 102, gauge(s) 104, and positioning component 502 are measuring and estimating the aircraft state. The mapping component 112 maps the noise-restricted areas. These data are collected and used by the modeling component 502 to model how the sound of the aircraft varies with thrust and distance from the noise-restricted areas. The noise abatement component 114 then uses these data to calculate optimal flight and engine control. It is contemplated that the artificial intelligence component 602 can automate one or more of these utility-based analysis in connection with optimizing the DOC and respective noise abatement.

Figure 8:
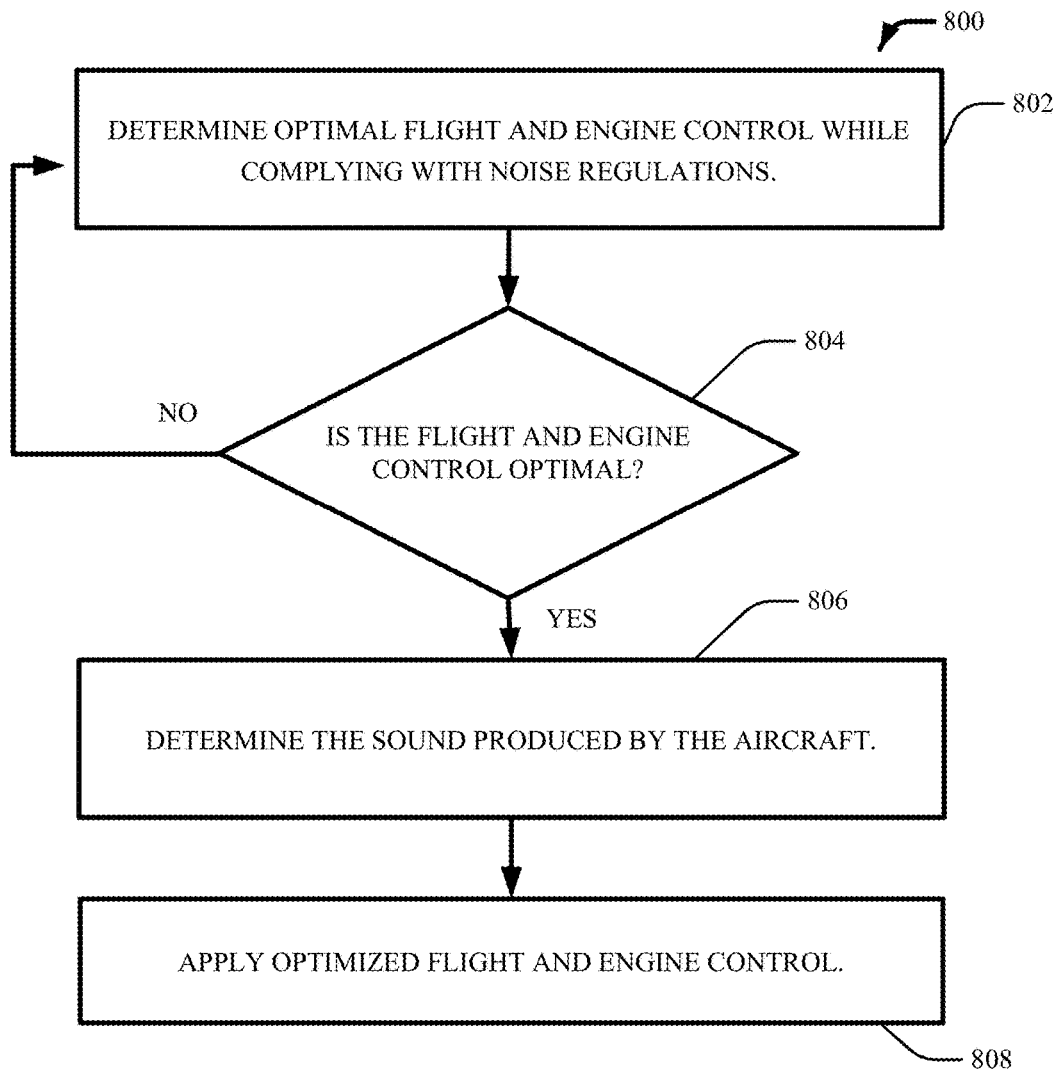
FIG. 8 illustrates an example, non-limiting method in accordance with one or more embodiments described herein.

FIG. 8 illustrates a flow diagram 800 in accordance with another implementation. At 802, optimal flight and engine control is determined while complying with noise regulations. At 804, a determination is made whether the flight and engine control is optimal. If no, the process continues to determine optimal flight and engine control. If yes, at 806, determine the sound produced by the aircraft, and at 808, apply optimized flight and engine control.

As the aircraft climbs out of the noise-restricted area, determined by the line-of sight distance to the noise-restricted location, the constrained thrust and speed is constantly changing to take advantage of the distance as the aircraft moves further away from the restricted location. The aircraft is also gradually getting lighter as fuel is used up. As such, the aircraft control system 100 can factor in changes to optimize the flight and engine control at every point of the flight. Thus, the noise abatement 100 can continually monitor aircraft state and its environment, determine optimal flight and engine control(s), and apply the optimal flight and engine control(s) that comply with noise regulations.

Figure 9:
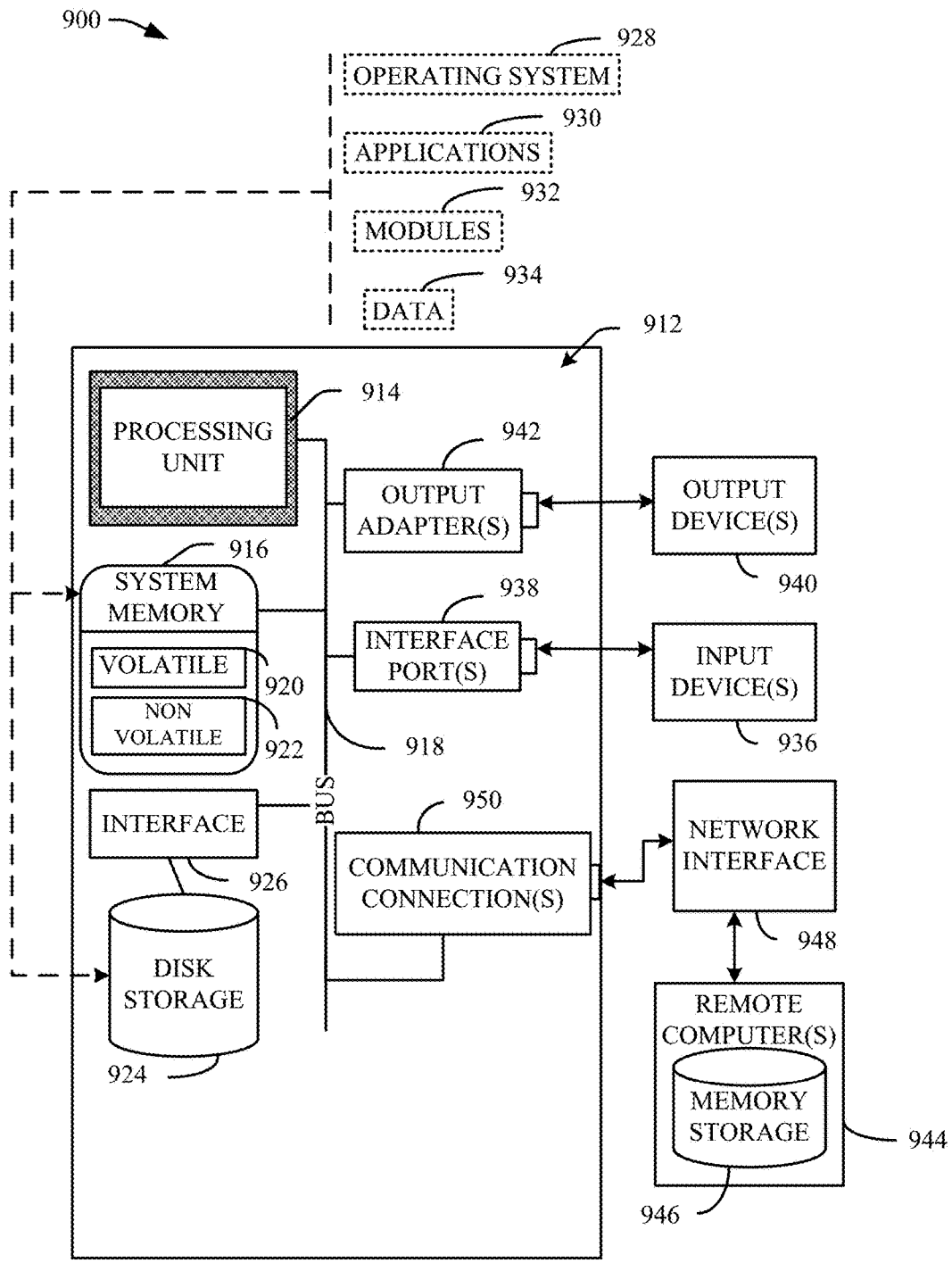
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 994), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An aircraft control system, comprising:
    a processor that executes the following computer executable components stored in a memory:
        a set of sensors, gauges and positioning component that measure and estimate state of an aircraft, including a line-of-sight distance from the aircraft to a ground noise restriction location or to a geographical point of interest;
        a mapping component that maps noise-restricted areas of a flight path defined by relative position of the aircraft to ground noise restriction locations; and
        a noise abatement component that computes optimal thrust, flight, and engine control of the aircraft in a noise abatement volume, based on the line-of-sight distance from the aircraft, wherein the aircraft operates at the computed optimal thrust, flight, and engine control in the noise abatement volume, thereby minimizing direct operating cost (DOC) while obeying noise constraints.

2. The system of claim 1, wherein engine thrust approaches optimal control as altitude increases while complying with noise restriction levels on the ground.

3. The system of claim 1, further comprising an artificial intelligence component that performs a utility-based analysis in connection with optimizing the DOC and respective noise abatement.

4. The system of claim 1, wherein the noise abatement component factors noise level at the ground.

5. The system of claim 1, wherein speed through the noise abatement volume is determined based on thrust that is constrained to comply with noise regulation.

6. The system of claim 1, wherein the noise abatement component generates predefined routes for optimal noise, fuel, and time as a function of class and size of the aircraft.

7. The system of claim 1, wherein the noise abatement component employs a noise de-rate setting to facilitate regulating thrust to limit the amount of noise produced by engines of the aircraft.

8. The system of claim 1, wherein the noise abatement component constrains admissible control of the aircraft to comply with noise regulations, wherein the admissible control is a control history that accurately complies with operational and performance constraints of the aircraft.

9. The system of claim 8, further comprising a modeling component that models how sound from an engine of the aircraft varies with thrust and distance of the aircraft from ground, wherein the noise abatement component can generate data to employ for increasing thrust of the engine, and thus sound produced by the engine, while complying with maximum sound pressure level permitted on the ground.

10. The system of claim 1, wherein engine thrust is decreased when approaching locations where noise restriction is required, based on the distance to a geographic point of interest in order to comply with noise regulations relative to the geographic point of interest.

11. The system of claim 10, wherein noise is a control variable that limits the engine control.

12. A method comprising:
employing a processor to execute computer executable components stored in a memory to perform the following acts:
using a set of sensors, gauges, and positioning component to measure and estimate state of an aircraft, including a line-of-sight distance from the aircraft to a ground noise restriction location or to a geographical point of interest;
using a mapping component to map noise-restricted areas of a flight path defined by relative position of the aircraft to ground noise restriction locations; and
using a noise abatement component to compute optimal thrust, flight, and engine control of the aircraft in a noise-abatement volume, based on the line-of-sight distance from the aircraft, wherein the aircraft operates at the computed optimal thrust, flight, and engine control in the noise abatement volume, thereby minimizing DOC while obeying noise constraints.

13. The method of claim 12, further comprising increasing engine thrust as altitude increases while complying with noise restriction levels on the ground.

14. The method of claim 12, further comprising determining speed through the noise abatement volume based on thrust that is constrained to comply with noise regulation.

15. The method of claim 12, further comprising using the noise abatement component to constrain admissible control of the aircraft to comply with noise regulations, wherein the admissible control is a control history that accurately complies with operational and performance constraints of the aircraft.

16. The method of claim 15, further comprising using a modeling component to model how sound from an engine of the aircraft varies with thrust and distance of the aircraft from ground, and using the noise abatement component to generate data to employ for increasing thrust of the engine, and thus sound produced by the engine, while complying with maximum sound pressure level permitted on the ground.

17. A computer program product for facilitating aircraft noise abatement, the computer program product comprising a computer readable storage medium having program instructions embodied therewith, the program instructions executable by a processor to cause the processor to:
use a set of sensors, gauges, and positioning component to measure and estimate state of an aircraft, including a line-of-sight distance from the aircraft to a ground noise restriction location or to a geographical point of interest;
use a mapping component to map noise-restricted areas of a flight path defined by relative position of the aircraft to ground noise restriction locations; and
use a noise abatement component to compute optimal thrust, flight, and engine control of the aircraft in a noise abatement volume, based on the line-of-sight distance from the aircraft, wherein the aircraft operates at the computed optimal thrust, flight, and engine control in the noise abatement volume, thereby minimizing DOC while obeying noise constraints.

18. The computer program product of claim 17, wherein the program instructions are further executable by the processor to cause the processor to: use the noise abatement component to constrain admissible control of the aircraft to comply with noise regulations, wherein the admissible control is a control history that accurately complies with operational and performance constraints of the aircraft.

19. The computer program product of claim 17, wherein the program instructions are further executable by the processor to cause the processor to: use a modeling component to model how sound from an engine of the aircraft varies with thrust and distance of the aircraft from ground, and using the noise abatement component to generate data to employ for increasing thrust of the engine, and thus sound produced by the engine, while complying with maximum sound pressure level permitted on the ground.

20. The computer program product of claim 17, wherein the program instructions are further executable by the processor to cause the processor to: increase engine thrust as altitude increases while complying with noise restriction levels on the ground.

* * * * *